Feb. 16, 1932.   N. M. STANLEY   1,845,940

LENS

Filed Sept. 2. 1930

INVENTOR
NATHAN M. STANLEY.
BY
ATTORNEY

Patented Feb. 16, 1932

1,845,940

UNITED STATES PATENT OFFICE

NATHAN M. STANLEY, OF DAYTON, OHIO, ASSIGNOR, BY MESNE ASSIGNMENTS, OF ONE-HALF TO THE UNIVIS CORPORATION, OF WILMINGTON, DELAWARE, A CORPORATION OF DELAWARE AND ONE-HALF TO UNITED KINGDOM OPTICAL COMPANY, LIMITED, OF LONDON, ENGLAND

LENS

Application filed September 2, 1930. Serial No. 479,149.

My invention relates to lenses for eye glasses.

It is the object of my invention to provide an insert in a main lens for near distance vision, which insert will have a flat top, a shorter flat bottom and rounded edges providing the following advantages:

(1) The elimination of vertical prismatic displacement.

(2) The elimination of distortion of vision at the top of the insert.

(3) The provision of an extremely wide lateral field at the top of the insert.

(4) The provision of a controlled optical center of the insert.

(5) The provision of a lens with a space between the optical center of the main lens and the insert of a greater width than the width of the pupil of the eye.

(6) The elimination of the distorted area at the extreme bottom of the insert while providing full vision on either side of the insert.

(7) The provision of a wider field of vision at the bottom of the insert without distortion at that point.

(8) The provision of an insert above, to either side and below which long distance vision can be secured.

(9) The provision of a very deep near vision field without distortion at either the top or the bottom.

Heretofore, the difficulty with the inserts in bifocal lens has been that, when sufficient depth of the insert has been secured, distortion at either the bottom or the top resulted or there was vertical prismatic displacement.

On the other hand if this were corrected, there was an insufficient field of near vision and far vision.

It is my object to provide a lens combining all of the advantages necessary in a bifocal lens without any of the disadvantages.

Referring to the drawings.

Figure 1:
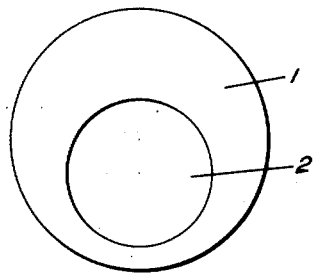
Figure 1 is a top plan view of the main lens having a circular depression in the surface thereof.

Referring to the drawings in detail, 1 is a main lens having a circular cutaway portion with a semi-circular bottom, as at 2. The main lens is made of crown glass adapted for long distance vision.

Figure 2:
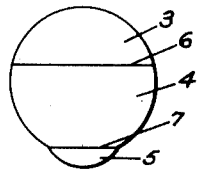
Figure 2 is a plan view of an insert of crown and flint glass adapted to be put in the depression.
Figure 3:
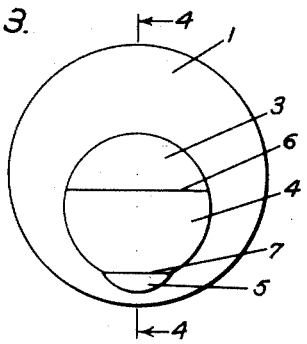
Figure 3 is a top plan view of the insert in position on the main lens.
Figure 4:
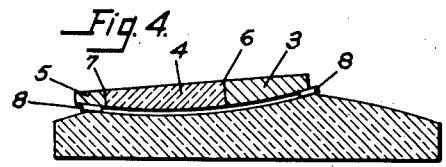
Figure 4 is a section on the line 4—4 of Figure 3.
Figure 5:
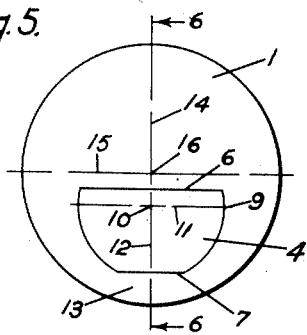
Figure 5 is a top plan view of the finished lens.
Figure 6:
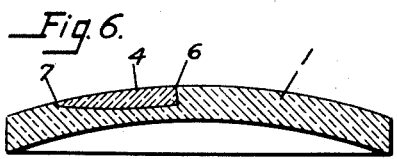
Figure 6 is a section on the line 6—6 thereof.
Figure 7:
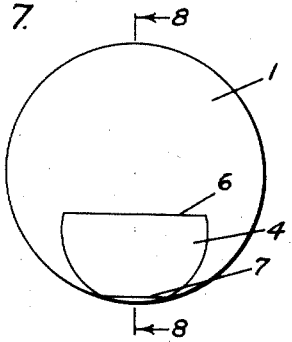
Figure 7 is a top plan view of a modified form of finished lens.
Figure 8:
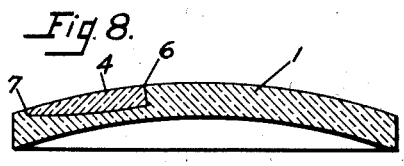
Figure 8 is a section on the line 8—8 of Figure 7.

The insert is shown in Figure 2 and consists of a crown portion 3, a flint portion 4 and a crown portion 5. The flint portion has a flat top 6 and a flat bottom 7 for receiving the corresponding flat surfaces of the respective crown portions 3 and 5. The insert is mounted upon the usual feelers 8 and is fused to the main lens with the result that the crown glass disappears into and becomes amalgamated with the crown glass of the main lens leaving the insert 4 having a flat top 6 and a flat bottom 7. The insert 4 has its curved sides 9 laid out about the center 10. The diameter of this circle, of which the insert is a part, is measured by the diameter 11. The top 6 is less in length than the diameter 11. The top 6 is greater than the length of the bottom 7 while the bottom 7 is less than the diameter 11. The vertical dimension indicated by the line 12 of the insert is less than the diameter 11.

By cutting off the bottom of the insert the depth of vision is substantially preserved while the distorted area at the bottom of the insert is eliminated. Ample vision for long distance is provided in one form where desired below the insert as at 13.

The axis 12 of the insert coincides with the axis 14 of the major lens. The top 6 of the insert is parallel with the horizontal diameter 15 of the main lens. 16 designates the center of the main lens.

It will be further noted that there is ample vision on either side of the insert and that, due to the flat top of the insert, vertical prismatic displacement has been eliminated and all distortion is eliminated so that the vision of the eye can pass without disturbance from long distance to near distance, and vice versa.

The radius of the insert is, of course, one-half the length of the diameter line 11.

It will be understood that I desire to comprehend within my invention such modifications as may be necessary to adapt it to varying conditions and uses.

Having thus fully described my invention, what I claim as new and desire to secure by Letters Patent, is:

1. In a lens, a major lens and an insert of higher index glass from the major lens, said insert consisting of a circular member less than a full circle with a flat top and a flat bottom of different lengths, the vertical dimension of said insert being greater than the radius of the circle but less than the diameter of the circle.

2. In a lens, a major lens and an insert of different glass from the major lens, said insert consisting of a circular member less than a full circle with a flat top and a flat bottom, the vertical dimension of said insert being less than the diameter thereof and greater than the radius thereof, said flat top being longer than said flat bottom.

3. In a lens, a major lens and an insert of different glass from the major lens, said insert consisting of a circular member less than a full circle with a flat top and a flat bottom of different lengths, the vertical dimension thereof being greater than the radius of the circle of the insert but less than the diameter thereof, said insert being spaced from the bottom of said walls of the major lens to permit vision on either side and below as well as above the insert without distortion and displacement when passing from one portion of the lens to the other.

4. In a lens, a major lens of one kind of glass, a circular insert of another kind of glass having its top cut off above the major diameter thereof and parallel therewith and its bottom cut off parallel with the top of the insert, the vertical dimension of the insert being less than the diameter but greater than the radius of the insert, said insert being located with its flat top and bottom parallel to but spaced from the horizontal center line of the major lens, said insert being located on the major lens above the bottom thereof, below the center thereof and spaced from the sides thereof so that vision through the main lens can be had on all sides of the insert lens.

5. In a lens, a major lens of crown glass having a circular cutaway portion forming a semi-circular depression spaced from the bottom, side walls and top of the major lens, a circular insert located within said depression comprising a central portion of flint glass bounded by chords of different lengths above and below the diameter of the insert, said central portion having a vertical dimension less than the diameter of the insert but greater than the radius thereof, and crown glass portions completing the insert on either side of the central portion.

6. In a lens, a major lens, an insert therein, said insert having a flat top and a flat bottom of lesser length than the top, the vertical dimension of the insert being less than the diameter of the segment but greater than its radius and the flat bottom being approximately equal to the radius.

7. A new article of manufacture for use as a short distance insert of a crown glass major lens comprising a circular body formed of a central portion of flint glass separated from upper and lower portions by chords on opposite sides of the center of the insert, the upper chord being longer than the lower chord, and the vertical dimension of said flint insert being less than the diameter of the insert but greater than the radius thereof, the portions of the insert above and below said chords being of crown glass and adapted to merge into the main lens.

8. In a lens, a major lens and an insert of different glass from the major lens, said insert consisting of a circular member less than a full circle with a flat top and flat bottom, said top and bottom being of different lengths, the height of the insert between the faces being greater than the radius forming the circle but less than the diameter thereof.

9. In a lens, a major lens of one kind of glass, a circular insert of another kind of glass having its top cut off above the major diameter thereof and parallel therewith, and its bottom cut off parallel with the top of the insert, but at a greater distance from the center of the insert than the top is from the center of the insert and below the major diameter.

10. In a lens, a major portion with a countersink having a lens surface therein and a segmental portion of a different index of refraction secured in said countersink and related to said lens surface of the countersink for near vision through the segment and underlying major portion, said segmental portion having a flat top and a flat bottom of different lengths on opposite sides of the diameter of the segmental portion and circular side walls, the flat top being substantially parallel to the diameter of the major portion and below it while the center of the segmental portion coincides with the vertical axis of the major portion.

In testimony whereof, I affix my signature.

NATHAN M. STANLEY.